(12) United States Patent
Li et al.

(10) Patent No.: US 9,915,805 B2
(45) Date of Patent: Mar. 13, 2018

(54) PHOTOGRAPHIC OBJECTIVE LENS

(71) Applicant: HAN'S LASER TECHNOLOGY INDUSTRY GROUP CO., LTD., Shenzhen (CN)

(72) Inventors: Jiaying Li, Shenzhen (CN); Chaoming Zhou, Shenzhen (CN); Yunfeng Gao, Shenzhen (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 0 days.

(21) Appl. No.: 15/328,875

(22) PCT Filed: Sep. 3, 2014

(86) PCT No.: PCT/CN2014/085789
§ 371 (c)(1),
(2) Date: Jan. 24, 2017

(87) PCT Pub. No.: WO2016/033743
PCT Pub. Date: Mar. 10, 2016

(65) Prior Publication Data
US 2017/0212330 A1 Jul. 27, 2017

(51) Int. Cl.
*G02B 9/64* (2006.01)
*G02B 13/00* (2006.01)

(52) U.S. Cl.
CPC ............. *G02B 13/001* (2013.01); *G02B 9/64* (2013.01)

(58) Field of Classification Search
CPC ................................ G02B 13/001; G02B 9/64
USPC .................................................. 359/751, 755
See application file for complete search history.

(56) References Cited

U.S. PATENT DOCUMENTS

| 3,622,227 A | 11/1971 | Shimizu |
| 3,870,402 A | 3/1975 | Takahashi et al. |
| 3,958,864 A | 5/1976 | Glatzel |
| 2005/0117225 A1 | 6/2005 | Ebbesmeier |
| 2014/0240851 A1* | 8/2014 | Kawamura ............ G02B 13/04 359/708 |

FOREIGN PATENT DOCUMENTS

CN 103592746 A 2/2014

OTHER PUBLICATIONS

International Search Report dated Jun. 5, 2015 for application No. PCT/CN2014/085789.

* cited by examiner

*Primary Examiner* — Joseph P Martinez
*Assistant Examiner* — Vipin Patel
(74) *Attorney, Agent, or Firm* — Platinum Intellectual Property LLP

(57) ABSTRACT

A photographic objective lens includes a first lens (L1), a second lens (L2), a third lens (L3), a fourth lens (L4), a fifth lens (L5), a sixth lens (L6), and a seventh lens (L7), which are sequentially coaxially arranged along a propagation direction of incident light, wherein the first lens (L1) is a negative meniscus lens; the second lens (L2) is a drum lens; the third lens (L3) is a negative meniscus lens; the fourth lens (L4) is a drum lens; the fifth lens (L5) is a biconcave lens; the sixth lens (L6) is a positive meniscus lens; the seventh lens (L7) is a biconvex lens; the two curved surfaces of each lens are the light incidence surface and the light outgoing surface of the lens, respectively.

5 Claims, 6 Drawing Sheets 0.00 DEG

200

0.000 NM 9.00 DEG 1.802 NM 15.00 DEG 3.036 NM 21.00 DEG 4.327 NM 25.50 DEG 5.354 NM 36.00 DEG 8.117 NM

PHOTOGRAPHIC OBJECTIVE LENS

FIELD OF THE INVENTION

The present disclosure relates generally to the field of optics, and more specifically to a photographic objective lens.

BACKGROUND OF THE INVENTION

In the field of photography, some users have the demand for equipment miniaturization while ensuring a large field of view.

SUMMARY

Therefore, it is necessary to provide a small-sized photographic objective lens having a large field of view.

A photographic objective lens includes a first lens, a second lens, a third lens, a fourth lens, a fifth lens, a sixth lens, and a seventh lens, which are sequentially coaxially arranged along a propagation direction of incident light, wherein the first lens is a negative meniscus lens having a first curved surface and a second curved surface; the second lens is a drum lens having a third curved surface and a fourth curved surface; the third lens is a negative meniscus lens having a fifth curved surface and a sixth curved surface; the fourth lens is a drum lens having a seventh curved surface and an eighth curved surface; the fifth lens is a biconcave lens having a ninth curved surface and a tenth curved surface; the sixth lens is a positive meniscus lens having an eleventh curved surface and a twelfth curved surface; the seventh lens is a biconvex lens having a thirteenth curved surface and a fourteenth curved surface; two curved surfaces of each lens are a light incidence surface and a light outgoing surface of the lens, respectively, and the first to the fourteenth curved surfaces are sequentially arranged along the propagation direction of the incident light, wherein radii of curvature of the first to the fourteenth curved surfaces are 30.5±5%, 9.6±5%, 250±5%, −26±5%, 17±5%, 6.7±5%, 15.5±5%, −12±5%, −13±5%, 20±5%, −30±5%, −10±5%, 31±5%, and −21±5%, respectively, and center thicknesses of the first lens to the seventh lens are 2±5%, 9 ±5%, 1.5±5%, 9±5%, 0.8±5%, 2±5%, and 3±5%, respectively, in millimeters.

In one embodiment, an interval between the second curved surface and the third curved surface along an optical axis is 4.2 mm±5%, an interval between the fourth curved surface and the fifth curved surface along the optical axis is 0.2 mm±5%, an interval between the sixth curved surface and the seventh curved surface along the optical axis is 5 mm±5%, an interval between the eighth curved surface and the ninth curved surface along the optical axis is 2.4 mm±5%, an interval between the tenth curved surface and the eleventh curved surface along the optical axis is 1.6 mm±5%, an interval between the twelfth curved surface and the thirteenth curved surface along the optical axis is 0.2 mm±5%.

In one embodiment, ratios of refractive index to Abbe number of the first to the seventh lenses are (1.5/64)±5%, (1.67/32)±5%, (1.61/55)±5%, (1.63/55)±5%, (1.75/27)±5%, (1.62/60)±5%, and (1.62/60)±5%, respectively.

In one embodiment, clear apertures of the first to the seventh lenses are 18±5%, 13±5%, 9±5%, 9±5%, 10±5%, 11±5%, and 14±5%, respectively, in millimeters.

In one embodiment, an interval from the first curved surface to an image plane of the photographic objective lens along the optical axis is 56.9±5% mm.

By using a drum lens with a large thickness, the photographic objective lens not only has a super large field of view, but also has features of large relative aperture, small size, and large working distance. Therefore the demand for the photographic objective lens having a flat field while ensuring a large relative aperture, a small size, and a large working distance can be met. The photographic objective lens can be used in a 1-inch frame photographic system, and it is suitable for a variety of photosensitive mediums, such as CCD, photographic films and so on, and it is especially applicable to a photographic system which requires miniaturization and high image quality.

BRIEF DESCRIPTION OF THE DRAWINGS

The above and other objects, features and advantages of the present disclosure will become more apparent referring to the detailed description of the preferred embodiments as illustrated in the accompanying drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items.

It should be noted that the propagation direction of the light in the accompanying drawings of the present document is from left to right. Whether the radius of curvature is positive or negative is determined by the position of the intersection of the ball center of the curved surface and the main optical axis. When the ball center of the curved surface is on the left side of the intersection, the radius of curvature is negative; when the ball center of the curved surface is on the right side of the intersection, the radius of curvature is positive. In addition, the left side of the lens is an object side, the right side of the lens is an image side. The positive lens is a lens in which the thickness of the center is larger than the thickness of the edge, and the negative lens is a lens in which the thickness of the center is smaller than the thickness of the edge.

Figure 1:
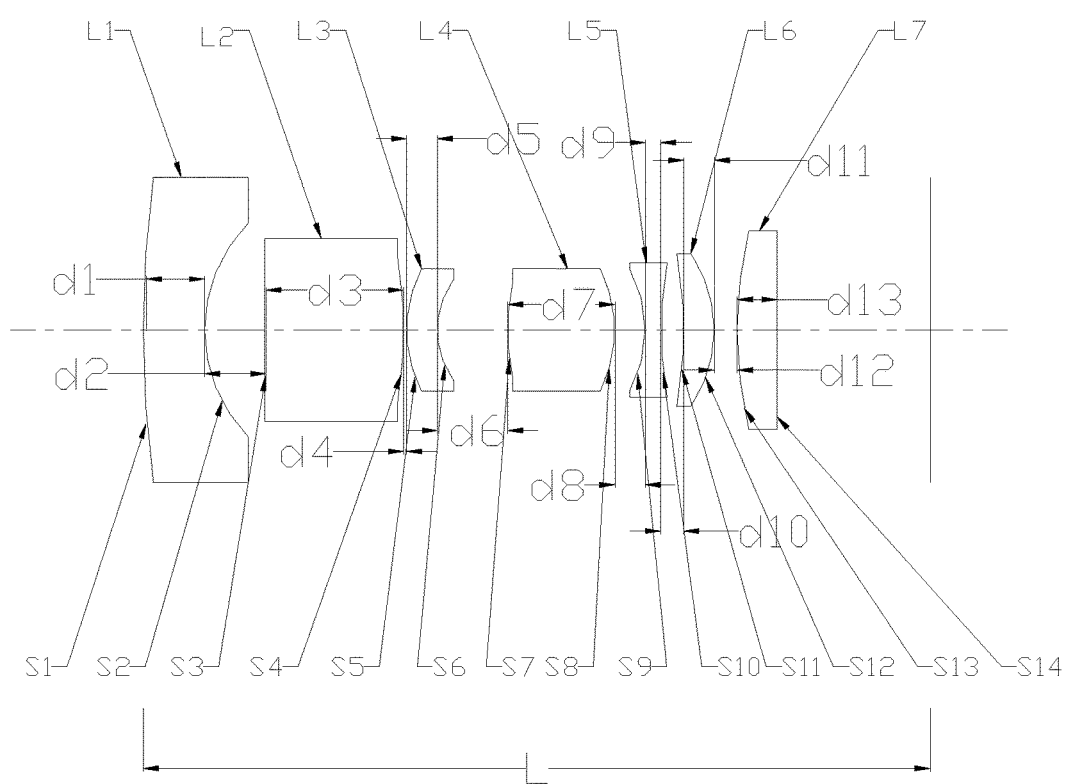
FIG. 1 is a schematic diagram of a photographic objective lens in an embodiment.

FIG. 1 is a schematic diagram of a photographic objective lens according to an embodiment, for illustrative purposes, only portions related to implementation of the disclosure are shown. The photographic objective lens includes a first lens L1, a second lens L2, a third lens L3, a fourth lens L4, a fifth lens L5, a sixth lens L6, and a seventh lens L7, which are sequentially coaxially arranged along a propagation direction of incident light. The first lens L1 is a negative meniscus lens having a first curved surface S1 and a second curved surface S2. The second lens L2 is a drum lens having a third curved surface S3 and a fourth curved surface S4. The third lens L3 is a negative meniscus lens having a fifth curved surface S5 and a sixth curved surface S6. The fourth lens L4 is a drum lens having a seventh curved surface S7 and an eighth curved surface S8. The fifth lens L5 is a biconcave lens having a ninth curved surface S9 and a tenth curved surface S10. The sixth lens L6 is a positive meniscus lens having an eleventh curved surface S11 and a twelfth curved surface S12. The seventh lens L7 is a biconvex lens having a thirteenth curved surface S13 and a fourteenth curved surface S14. Two curved surfaces of each lens are a light incidence surface and a light outgoing surface of the lens, respectively. The first curved surface Si to the fourteenth curved surface S14 are sequentially arranged along the propagation direction of the incident light.

Specifically, in one embodiment, the first curved surface Si of the first lens L1 is convex towards the object side, a radius of curvature of which is 30.5 mm. The second curved surface S2 is convex towards the same side as the first curved surface S1, and a radius of curvature of which is 9.6 mm. A center thickness dl of the first lens L1 (i.e., a thickness of the first lens L1 along an optical axis) is 2 mm. A ratio of the refractive index Nd1 to the Abbe number Vd1 of the first lens L1 is 1.5/64. A clear aperture φ of the first lens L1 is 18 mm. The foregoing parameters are not the only choice, as there is a 5% tolerance range, i.e. those parameters can vary within a range of ±5%.

The third curved surface S3 of the second lens L2 is convex towards the object side, a radius of curvature of which is 250 mm. The forth curved surface is convex towards the image side, a radius of curvature of which is −26 mm. A center thickness d3 of the second lens L2 is 9 mm. A ratio of the refractive index Nd2 to the Abbe number Vd2 of the second lens L2 is 1.67/32. A clear aperture φ of the second lens L2 is 13 mm. An interval d2 between the second lens L2 and the first lens L1 along the optical axis is 4.2 mm. Each parameter of the second lens L2 has a tolerance range of 5%.

The fifth curved surface S5 of the third lens L3 is convex towards the object side, a radius of curvature of which is 17 mm. The sixth curved surface S6 is convex towards the same side as the fifth curved surface S5, and a radius of curvature of which is 6.7 mm. A center thickness d5 of the third lens L3 is 1.5 mm. A ratio of the refractive index Nd3 to the Abbe number Vd3 of the third lens L3 is 1.61/55. A clear aperture Φ of the third lens L3 is 9 mm. An interval d4 between the third lens L3 and the second lens L2 along the optical axis is 0.2 mm. Each parameter of the third lens L3 has a tolerance range of 5%.

The seventh curved surface S7 of the fourth lens L4 is convex towards the object side, a radius of curvature of which is 15.5 mm. The eighth curved surface S8 is convex outwardly in respect to the seventh curved surface S7, a radius of curvature of which is −12 mm. A ratio of the refractive index Nd4 to the Abbe number Vd4 of the fourth lens L4 is 1.63/55, and a center thickness d7 of which is 9 mm. A clear aperture φ of the fourth lens L4 is 9 mm. An interval d6 between the fourth lens L4 and the third lens L3 along the optical axis is 5 mm. Each parameter of the fourth lens L4 has a tolerance range of 5%.

The ninth curved surface S9 of the fifth lens L5 is convex towards the image side, a radius of curvature of which is −13 mm. The tenth curved surface S10 is concave inwardly in respect to the ninth curved surface S9, a radius of curvature of which is 20 mm. A ratio of the refractive index Nd5 to the Abbe number Vd5 of the fifth lens L5 is 1.75/27, and a center thickness d9 of which is 0.8 mm. A clear aperture I of the fifth lens L5 is 10 mm. An interval d8 between the fifth lens L5 and the fourth lens L4 along the optical axis is 2.4 mm. Each parameter of the fifth lens L5 has a tolerance range of 5%.

The eleventh curved surface S11 of the sixth lens L6 is convex towards the image side, a radius of curvature of which is −30 mm. The twelfth curved surface S12 is convex towards the image side, a radius of curvature of which is −10 mm. A ratio of the refractive index Nd6 to the Abbe number Vd6 of the sixth lens L6 is 1.62/60, and a center thickness d11 of which is 2 mm. A clear aperture φ of the sixth lens L6 is 11 mm. An interval d10 between the sixth lens L6 and the fifth lens L5 along the optical axis is 1.6 mm. Each parameter of the sixth lens L6 has a tolerance range of 5%.

The thirteenth curved surface S13 of the seventh lens L7 is convex towards the object side, a radius of curvature of which is 31 mm. The fourteenth curved surface S14 is convex towards the image side, a radius of curvature of which is −21 mm. A ratio of the refractive index Nd7 to the Abbe number Vd7 of the seventh lens L7 is 1.62/60, and a center thickness d13 of which is 14 mm. A clear aperture Φ of the seventh lens L7 is 14 mm. An interval d12 between the seventh lens L7 and the sixth lens L6 along the optical axis is 0.2 mm. Each parameter of the seventh lens L7 has a tolerance range of 5%.

In addition, the foregoing photographic objective lens is designed for achromatic aberration for $\lambda=550$ nm green light, $\lambda=486$ nm blue light, and $\lambda=656$ nm red light. A total length of the photographic objective lens (i.e., a distance from the first curved surface S1 to an image plane of the photographic objective lens) L=56.9 mm, which may have a tolerance of 5%.

The foregoing photographic objective lens has a focal length f=110 mm, a relative aperture D/f=1:2.8, and a visual field angle $2\omega=72°$.

In the field of photographic objective lens, it is generally a taboo to use an extra-thick positive lens, as it will increase the curvature of the positive image plane, thus makes it can not be adjusted to a plane, such that a photographic objective lens with a large field of view cannot be designed. The foregoing photographic objective lens overcomes the technical bias, by using a drum lens with a large thickness, the photographic objective lens not only has a super large field of view, but also has features of large relative aperture, small size, and large working distance. Therefore the demand for the photographic objective lens having a flat field while ensuring a large relative aperture, a small size, and a large working distance can be met. The photographic objective lens can be used in a 1-inch frame photographic system, and it is suitable for a variety of photosensitive mediums, such as CCD, photographic films and so on, and it is especially applicable to a photographic system which requires miniaturization and high image quality. It is worth mentioning that, the lens of the photographic objective lens only uses ordinary optical materials, therefore the cost is also quite low.

Figure 2:
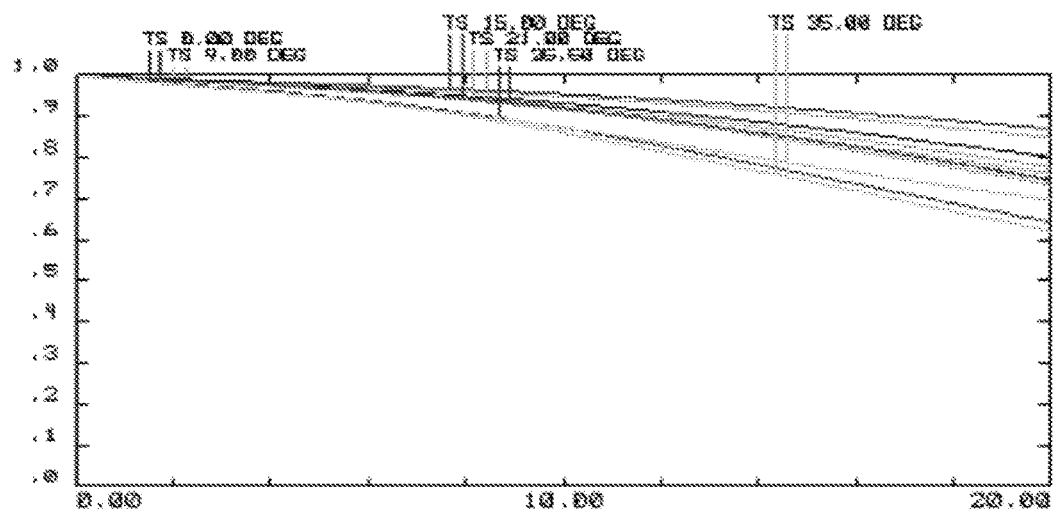
FIG. 2 is a diagram illustrating modulation transfer function M.T.F of the photographic objective lens of FIG. 1.
Figure 3:
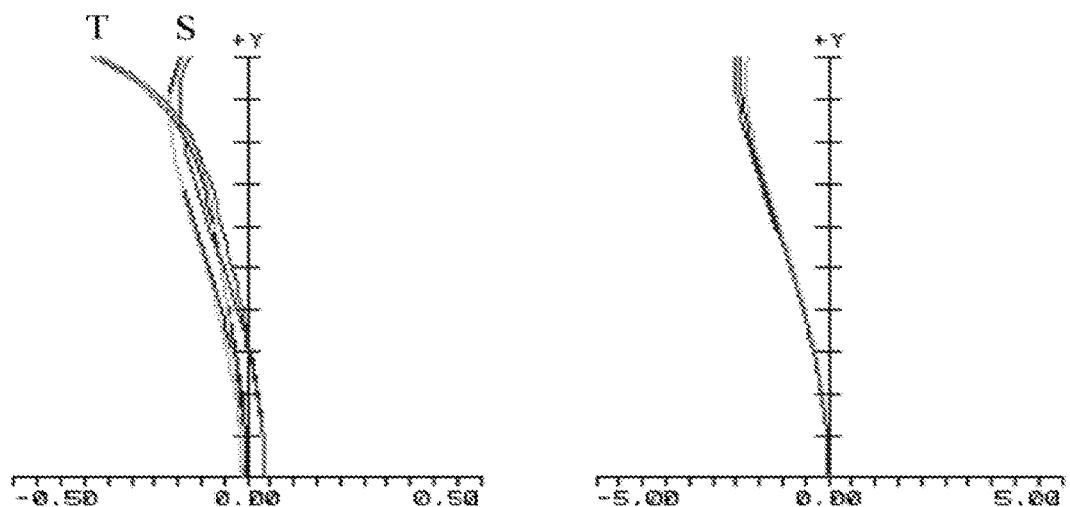
FIG. 3 is a diagram illustrating dispersion and distortion of the photographic objective lens of FIG. 1.
Figure 4:
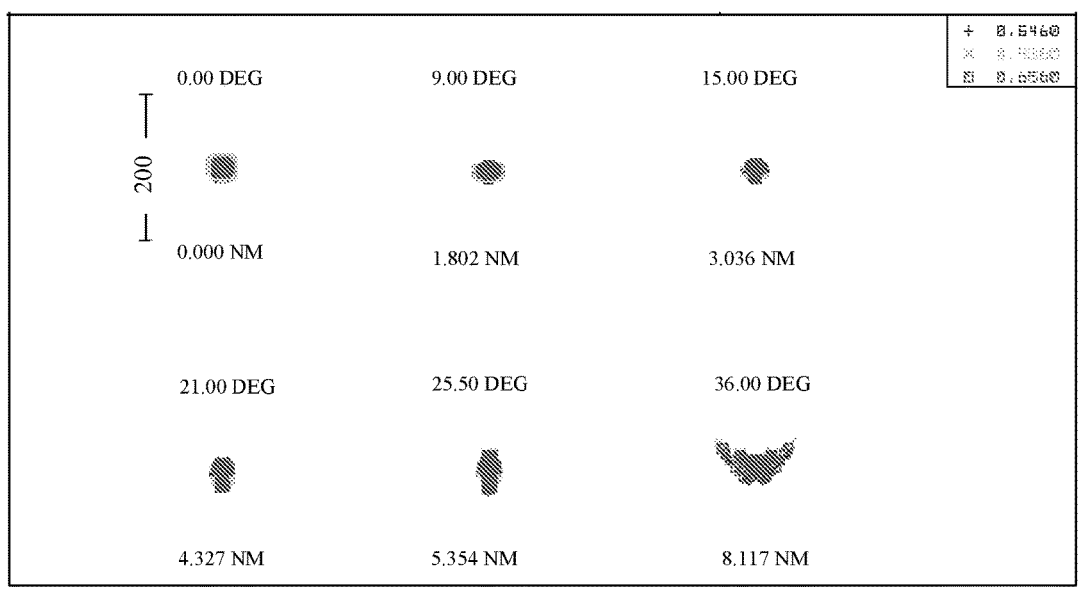
FIG. 4 is a diagram illustrating aberration diffuse spots of the photographic objective lens of FIG. 1.
Figure 5A:
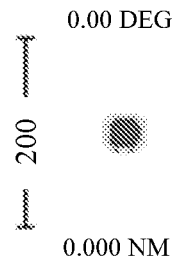
FIG. 5a-5f are partial enlarged views of each diffuse spots of FIG. 4.
Figure 5B:
Figure 5C:
Figure 5D:
Figure 5E:
Figure 5F:

FIG. 2 is a diagram illustrating the modulation transfer function M.T.F of the photographic objective lens of FIG. 1, in which the abscissa represents resolution in line pairs/mm, and TS represents the field of view in degrees. The diagram illustrates that when the resolution reach 20 lines/mm, the value of the M.T.F is still more than 0.6, thus achieving an ideal state. FIG. 3 is a graph of dispersion and distortion of the photographic objective lens of FIG. 1, in which the ordinate +Y represents the size of the field of view. The graph illustrates the fine beam aberration of the photographing objective, wherein the maximum value of the distortion is less than 2%, the worst of XT and YS is less than 0.3 mm. FIG. 5 is a diagram of aberration diffuse spots of the photographic objective lens of FIG. 1, which illustrates the wide beam aberration of the photographing objective. FIG. 5a-5f are partial enlarged views of the respective diffuse spots of FIG. 4, wherein FIG. 5a shows the scale length of 200 microns. Each of the graphs of FIGS. 5a to 5f marks the angle of view (in degrees) and the imaging diameter in the image plane (in nanometers). It can be seen that the maximum geometric dispersion of the photographic objective lens is a dozen microns only. Accordingly, the image quality has reached the desired level in the entire image plane.

The foregoing implementations merely describe several embodiments of the present disclosure in detail, which should not be deemed as limitations to the scope of the present disclosure. It should be noted that without departing from the concept of the present disclosure, a number of modifications and variations can be made by those skilled in the art, and they shall all fall within the scope of the present disclosure. Therefore, the scope of the present disclosure shall be defined by the appended claims.

What is claimed is:

1. A photographic objective lens, comprising a first lens, a second lens, a third lens, a fourth lens, a fifth lens, a sixth lens, and a seventh lens, which are sequentially coaxially arranged along a propagation direction of incident light, wherein the first lens is a negative meniscus lens having a first curved surface and a second curved surface; the second lens is a drum lens having a third curved surface and a fourth curved surface; the third lens is a negative meniscus lens having a fifth curved surface and a sixth curved surface; the fourth lens is a drum lens having a seventh curved surface and an eighth curved surface; the fifth lens is a biconcave lens having a ninth curved surface and a tenth curved surface; the sixth lens is a positive meniscus lens having an eleventh curved surface and a twelfth curved surface; the seventh lens is a biconvex lens having a thirteenth curved surface and a fourteenth curved surface;

two curved surfaces of each lens are a light incidence surface and a light outgoing surface of the lens, respectively, and the first to the fourteenth curved surfaces are sequentially arranged along a propagation direction of the incident light, wherein radii of curvature of the first to the fourteenth curved surfaces are 30.5±5%, 9.6±5%, 250±5%, −26±5%, 17±5%, 6.7±5%, 15.5±5%, −12±5%, −13±5%, 20±5%, −30±5%, −10±5%, 31±5%, and −211±5%, respectively, and center thicknesses of the first lens to the seventh lens are 2±5%, 9±5%, 1.5±5%, 9±5%, 0.8±5%, 2±5%, and 3±5%, respectively, in millimeters.

2. The photographic objective lens of claim 1, wherein an interval between the second curved surface and the third curved surface along an optical axis is 4.2 mm±5%, an interval between the fourth curved surface and the fifth curved surface along the optical axis is 0.2 mm±5%, an interval between the sixth curved surface and the seventh curved surface along the optical axis is 5 mm±5%, an interval between the eighth curved surface and the ninth curved surface along the optical axis is 2.4 mm±5%, an interval between the tenth curved surface and the eleventh curved surface along the optical axis is 1.6 mm±5%, an interval between the twelfth curved surface and the thirteenth curved surface along the optical axis is 0.2 mm±5%.

3. The photographic objective lens of claim 1, wherein ratios of refractive index to Abbe number of the first to the seventh lenses are (1.5/64) ±5%, (1.67/32) ±5%, (1.61/55) ±5%, (1.63/55) ±5%, (1.75/27) ±5%, (1.62/60) ±5%, and (1.62/60) ±5%, respectively.

4. The photographic objective lens of claim 1, wherein clear apertures of the first to the seventh lenses are 18±5%, 13±5%, 9±5%, 9±5%, 10±5%, 11±5%, and 14±5%, respectively, in millimeters.

5. The photographic objective lens of claim 1, wherein an interval from the first curved surface to an image plane of the photographic objective lens along an optical axis is 56.9±5% mm.

* * * * *